United States Patent
Mayoux

(10) Patent No.: US 12,162,340 B2
(45) Date of Patent: Dec. 10, 2024

(54) DRIVETRAIN FOR AN ELECTRIC VEHICLE AND ELECTRIC VEHICLE COMPRISING SUCH A DRIVETRAIN

(71) Applicant: Volvo Truck Corporation, Gothenburg (SE)

(72) Inventor: Sylvain Mayoux, Saint Priest (FR)

(73) Assignee: VOLVO TRUCK CORPORATION, Gothenburg (SE)

(*) Notice: Subject to any disclaimer, the term of this patent is extended or adjusted under 35 U.S.C. 154(b) by 0 days.

(21) Appl. No.: 18/414,172

(22) Filed: Jan. 16, 2024

(65) Prior Publication Data

US 2024/0239170 A1    Jul. 18, 2024

(30) Foreign Application Priority Data

Jan. 18, 2023 (EP) ..................................... 23152221

(51) Int. Cl.
*B60K 17/16*   (2006.01)
*B60K 1/00*   (2006.01)

(52) U.S. Cl.
CPC .............. *B60K 1/00* (2013.01); *B60K 17/165* (2013.01); *B60K 2001/001* (2013.01)

(58) Field of Classification Search
CPC ... B60K 1/00; B60K 17/165; B60K 2001/001
See application file for complete search history.

(56) References Cited

U.S. PATENT DOCUMENTS

| | | |
|---|---|---|
| 2016/0215857 A1 | 7/2016 | Eo et al. |
| 2017/0059023 A1 | 3/2017 | Severinsson et al. |
| 2017/0210224 A1* | 7/2017 | Younggren ............. F16H 61/32 |
| 2019/0383373 A1* | 12/2019 | Engerman ............. F16H 37/082 |
| 2020/0040967 A1* | 2/2020 | Engerman ................. F16H 3/44 |

FOREIGN PATENT DOCUMENTS

| | | |
|---|---|---|
| CN | 217056181 U | 7/2022 |
| DE | 102018131506 A1 | 6/2020 |
| DE | 102020201890 A1 | 8/2021 |
| KR | 20160131537 A | 11/2016 |
| WO | 2021078388 A1 | 4/2021 |
| WO | 2021121604 A1 | 6/2021 |

OTHER PUBLICATIONS

European Search Report for European Patent Application No. 23152221.0, mailed Jun. 23, 2023, 2 pages.

* cited by examiner

*Primary Examiner* — Edwin A Young
(74) *Attorney, Agent, or Firm* — Sage Patent Group

(57) ABSTRACT

A drivetrain includes a main shaft, driven by an electric motor, and a wheel output shaft. Two gearwheels, mounted around the output shaft to rotate freely, are meshing with respective main pinions integral with the main shaft. A clutch system car engage either one of the gearwheel with the output shaft. To reduce the load applied to the gearwheels, the drivetrain includes a recirculation shaft, freely rotating relative to a housing of the drivetrain, and two recirculation pinion, integral with the recirculation shaft, each meshing with a respective gearwheel. When the clutch system engages one of the gearwheel with the output shaft, the recirculation shaft is driven by the main shaft through the other gearwheel meshing with the respective main and recirculation pinions, and the output shaft is driven both by the main and recirculation shafts, through the engaged gearwheel meshing with the respective main and recirculation pinions.

14 Claims, 3 Drawing Sheets

DRIVETRAIN FOR AN ELECTRIC VEHICLE AND ELECTRIC VEHICLE COMPRISING SUCH A DRIVETRAIN

CROSS REFERENCE TO RELATED APPLICATION

This application claims foreign priority to European Application No. 23152221.0 filed on Jan. 18, 2023, the disclosure and content of which is incorporated by reference herein in its entirety.

TECHNICAL FIELD

The disclosure relates generally to electric vehicles. In particular aspects, the disclosure relates to a drivetrain for an electric vehicle and to an electric vehicle comprising such a drivetrain. The disclosure can be applied in heavy-duty vehicles, such as trucks, buses, and construction equipment. Although the disclosure may be described with respect to a particular vehicle, the disclosure is not restricted to any particular vehicle.

BACKGROUND

Electric vehicles using electric motor for propulsion, such as cars, generally do not include a multi-gear transmission, but rather generally include a single gear ratio, as electric motors can generally operate efficiently over large rotational speed ranges. However, on heavy vehicles, such as trucks, buses and construction equipment, it is known to equip the drivetrain with a multi-gear transmission providing a slow gear ratio and a high gear ratio, the slow gear ratio being used to provide the torque necessary to start the vehicle and the high gear ratio being used in cruising conditions. To achieve high vehicle loading capacity, high reduction ratios are used.

However, the high reduction ratio usually used lead to highly loaded gears, in particular when the transmission is designed to be compact. In particular, with a standard parallel axis drivetrain, the gears must be designed to withstand high loads and are therefore heavy and bulky. This leads to additional weight, and can causes problems with the vehicle ground clearance.

SUMMARY

According to a first aspect of the disclosure, the disclosure relates to a drivetrain for an electric vehicle, comprising at least:
- a motor shaft, configured to be driven by an electric motor of the electric vehicle,
- an output shaft, configured to drive wheels of the electric vehicle,
- a main shaft, being driven by the motor shaft,
- a first main pinion and a first gearwheel meshing together, the first main pinion being integral with the main shaft and the first gearwheel being mounted around the output shaft so as to rotate freely around the output shaft,
- a second main pinion and a second gearwheel meshing together, the second main pinion being integral with the main shaft and the second gearwheel being mounted around the output shaft so as to rotate freely around the output shaft,
- a clutch system, the clutch system being mounted around the output shaft and being switchable between at least two positions:
  - a first position, in which the clutch system is engaged with the first gearwheel so as to couple the first gearwheel with the output shaft, and
  - a second position, in which the clutch system is engaged with the second gearwheel so as to couple the second gearwheel with the output shaft,
- a recirculation shaft, configured to be freely rotatable relative to a housing of the drivetrain,
- a first recirculation pinion, integral with the recirculation shaft and meshing with the first gearwheel, and
- a second recirculation pinion, integral with the recirculation shaft and meshing with the second gearwheel.

Furthermore, the drivetrain is switchable between two configurations:
- a first speed configuration, in which:
  - the clutch system is in the first position,
  - the recirculation shaft is driven by the main shaft through the second gearwheel meshing with the second main pinion and the second recirculation pinion, the second gearwheel freely rotating around the output shaft, and
  - the output shaft is driven both by the main shaft and by the recirculation shaft through the first gearwheel meshing with the first main pinion and the first recirculation pinion,
- a second speed configuration, in which:
  - the clutch system is in the second position,
  - the recirculation shaft is driven by the main shaft through the first gearwheel meshing with the first main pinion and the first recirculation pinion, the first gearwheel freely rotating around the output shaft, and
  - the output shaft is driven both by the main shaft and by the recirculation shaft through the second gearwheel meshing with the second main pinion and the second recirculation pinion.

The first aspect of the disclosure may seek to propose a drivetrain capable of achieving high reduction ratio while being compact and light. A technical benefit may include reducing the load on the gearwheels mounted around the output shaft as well as reducing the load on the pinions mounted around the main shaft, since the load is distributed between the main shaft and the recirculating shaft, and since each gearwheel is driven by two pinions instead of one. Hence, the gearwheels and the pinions can be designed to be lighter and more compact.

In some examples, the output shaft comprises a left output shaft, configured to drive a left wheel of the electric vehicle, and a right output shaft configured to drive a right wheel of the electric vehicle. The drivetrain further comprises a differential, mounted around the output shaft, wherein output gears of the differential are connected to the left output shaft and to the right output shaft. In the first position of the clutch system, the clutch system is engaged with the first gearwheel, so as to couple the first gearwheel with an input of the differential, and in the second position of the clutch system, the clutch system is engaged with the second gearwheel, so as to couple the second gearwheel with the input of the differential. A technical benefit may include improving the compactness of the drivetrain, since the differential is directly driven by the first gearwheel or by the second gearwheel through the clutch system.

In some examples, the differential comprises a carrier, the carrier being the input of the differential. The first gearwheel and the second gearwheel are mounted around the carrier so as to rotate freely around the carrier, and the clutch system is integral with the carrier. A technical benefit may include further improving the compactness of the drivetrain, since the diameter of the first and second gearwheels is used to accommodate the differential inside the first and second gearwheels.

In some examples, the drivetrain further comprises two bearings, each of the first gearwheel and the second gearwheel being mounted around the carrier through a respective bearing, and the bearings are preferably needle roller bearings, cylindrical roller bearings, single row tapered roller bearings or double row tapered roller bearings. A technical benefit may include the first and the second gearwheels to freely rotate around the carrier of the differential and therefore around the output shaft when not engaged with the clutch system.

In some examples, the motor shaft, the main shaft, the recirculation shaft and the output shaft are parallel shafts. A technical benefit may include providing a more compact, light and efficient parallel axis drivetrain.

In some examples, the drivetrain further comprises an auxiliary recirculation shaft, configured to be freely rotatable relative to the housing of the drivetrain, a first auxiliary recirculation pinion, being integral with the recirculation shaft and meshing with the first gearwheel, and a second auxiliary recirculation pinion, being integral with the recirculation shaft and meshing with the second gearwheel. In the first speed configuration of the drivetrain, the auxiliary recirculation shaft is driven by the main shaft through the second gearwheel meshing with the second main pinion and the second auxiliary recirculation pinion, and the output shaft is driven by the main shaft, by the recirculation shaft and by the auxiliary recirculation shaft, through the first gearwheel meshing with the first main pinion, the first recirculation pinion and the first auxiliary recirculation pinion. In the second speed configuration of the drivetrain, the auxiliary recirculation shaft is driven by the main shaft through the first gearwheel meshing with the first main pinion and the first auxiliary recirculation pinion, and the output shaft is driven by the main shaft, by the recirculation shaft and by the auxiliary recirculation shaft through the second gearwheel meshing with the second main pinion, the second recirculation pinion and the second auxiliary recirculation pinion. A technical benefit may include further reducing the load of the first and second gearwheels, since the load is distributed between the main shaft, the recirculating shaft and the auxiliary recirculation shaft, and since each gearwheel is driven by three pinions instead of one. Hence, the gearwheels and the pinions can be designed to be lighter and more compact.

In some examples, the drivetrain further comprises an input gear, integral with the main shaft and driven by the motor shaft. A technical benefit may include facilitating driving the main shaft.

In some examples, the drivetrain further comprises at least one intermediate shaft, driven by the motor shaft, driving the main shaft and acting as an additional reduction stage between the motor shaft and the output shaft. A technical benefit may include allowing the drivetrain to achieve a higher reduction ratio.

In some examples, the clutch system is a dog clutch. A technical benefit may include providing a simple, inexpensive and reliable clutch system.

In some examples, the clutch system is further switchable in a third neutral position, in which the clutch system is disengaged from the first gearwheel and disengaged from the second gearwheel, the output shaft being disconnected from the motor shaft. A technical benefit may include providing the drivetrain with a neutral position in which the motor shaft does not drive the output shaft.

In some examples, a ratio of a number of teeth of the first main pinion over a number of teeth of the second main pinion is essentially identical to a ratio of a number of teeth of the first recirculation pinion over a number of teeth of the second recirculation pinion, and, preferably, the first recirculation pinion is identical to the first main pinion and the second recirculation pinion is identical to the second main pinion. A technical benefit may include facilitating the meshing of the main and recirculation pinions with the gearwheels and making the operation of the drivetrain more reliable.

According to a second aspect of the disclosure, the disclosure also relates to an electric vehicle comprising an electric motor, a drivetrain and wheels, the drivetrain being driven by the electric motor and driving the wheels. According to the disclosure, the drivetrain is as described above. Thanks to the use of a drivetrain according to the disclosure, the vehicle is lighter and its ground clearance is improved.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

With reference to the appended drawings, below follows a more detailed description of aspects of the disclosure cited as examples.

DETAILED DESCRIPTION

Aspects set forth below represent the necessary information to enable those skilled in the art to practice the disclosure.

Figure 1:
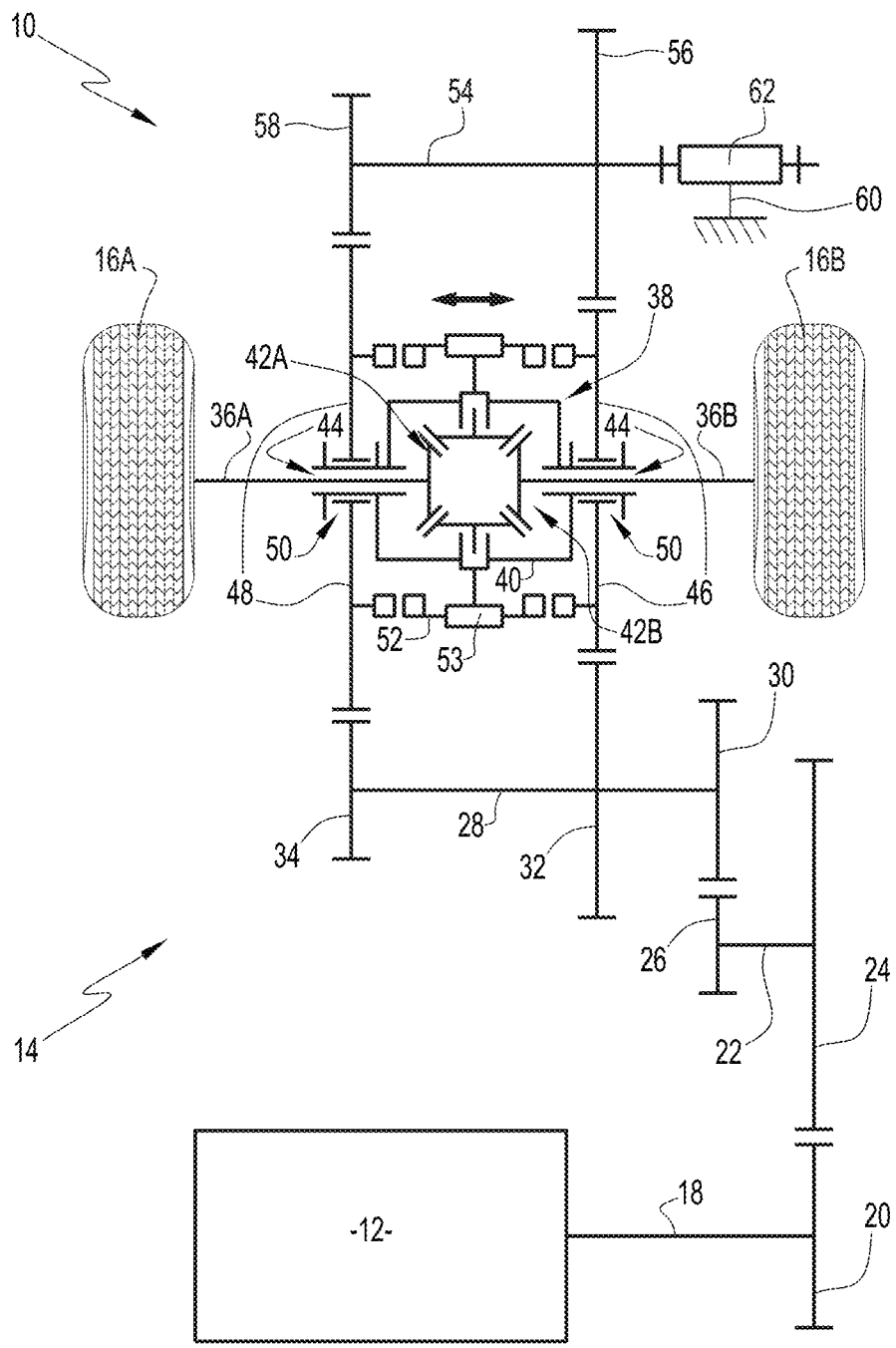
FIG. 1 is an exemplary diagram showing the operation of a vehicle according to the disclosure.

An electric vehicle 10 is shown in FIG. 1. The electric vehicle 10 is, for example, a truck, a bus or a construction equipment.

The vehicle 10 comprises an electric motor 12, a drivetrain 14, a left wheel 16A and a right wheel 16B. In the present description, the terms "left" and "right" are used only in reference to the orientation of the vehicle 10 in the figures, and are not restrictive.

The drivetrain 14 comprises a motor shaft 18, which is driven by the electric motor 12. In the example, the motor shaft 18 is an output shaft of the electric motor 12. The drivetrain 14 comprises an output gear 20, which is integral with the motor shaft 18. In the present description, the term "integral" refers either to two parts formed in one piece, or to two parts being assembled together so that there is no relative motion between the two parts, that is, two parts rigidly mounted together. In other words, a torque applied to a first part is transmitted to all the other parts with which the first part is integral.

Preferentially, the drivetrain 14 further comprises an intermediate reduction shaft 22, an input gear 24 and an output gear 26, which are integral with the intermediate reduction shaft. The input gear 24 meshes with the output gear 20 integral with the motor shaft 18, so that the intermediate reduction shaft 22 is driven by the motor shaft 18.

The drivetrain 14 further comprises a main shaft 28, an input gear 30, a first main pinion 32 and a second main pinion 34, which are integral with the main shaft 28. The input gear 30 meshes with the output gear 26 integral with the intermediate reduction shaft 22, so that the main shaft 28 is driven by the intermediate reduction shaft 22.

The drivetrain 14 further comprises a left output shaft 36A, which drives the left wheel 16A, and a right output shaft 36B, which drives the right wheel 16B. In other words, the left output shaft 36A is a left wheel shaft and the right output shaft is a right wheel shaft.

The drivetrain 14 further comprises a differential 38, which comprises a carrier 40, forming an input of the differential. The differential 38 also comprises a left output gear 42A, integral with the left output shaft 36A so as to drive the left output shaft, and a right output gear 42B, integral with the right output shaft 36B so as to drive the right output shaft. Therefore, the differential 38 drives the left and right output shafts 36A, 36B. The carrier 40 is mounted around the left and right output shafts 36A, 38B, preferably with bearings 44, so that the carrier rotate freely around the left and right output shafts. Alternatively, the drivetrain 14 comprises bearings with which the carrier 40 is mounted on a housing 60 of the drivetrain, so that the carrier rotate freely relative to the housing, around the left and right output shafts The operation of the differential, known in itself, is not further detailed here.

The drivetrain 14 further comprises a first gearwheel 46 and a second gearwheel 48 mounted around the carrier. Therefore, the first and second gearwheels 46, 48 are indirectly mounted around the right and left output shafts 36B, 36A, since the carrier is mounted around the right and left output shafts. The drivetrain comprises bearings 50, with which the first and second gearwheels 46, 48 are mounted around the carrier 40, so that the first and second gearwheels rotate freely around the carrier. Preferably, the bearings 50 are needle roller bearings, cylindrical roller bearings, single row tapered roller bearings or double row tapered roller bearings.

The first gearwheel 46 meshes with the first main pinion 32 and the second gearwheel 48 meshes with the second main pinion 34, so that the first and second gearwheels 46 and 48 are driven respectively by the first and second main pinions 32 and 34. In other words, since the first and second main pinions are integral with the main shaft 28, the first and second gearwheels are always rotating when the main shaft is rotating.

The ratio of the number of teeth of the first main pinion 32 over the number of teeth of the first gearwheel 46, which corresponds to a first reduction ratio, is different from the ratio of the number of teeth of the second main pinion 34 over the number of teeth of the second gearwheel 48, which corresponds to a second reduction ratio.

The drivetrain 14 further comprises a clutch system 52, which is, in the example, a dog clutch.

Alternatively, other clutch systems can be considered.

The dog clutch 52 is mounted onto the carrier 40 of the differential 38. More precisely, the dog clutch is mounted onto the carrier 40 through a sliding connection 53, so as to be able to translate along an axis parallel to the left and right output shafts 36A, 36B, and without being able to rotate relative to the carrier around the left and right output shafts. Therefore, the dog clutch is mounted around the differential, that is around the left and right output shafts 36A, 36B. The dog clutch 52 is switchable between three positions.

In a first position, the dog clutch 52 is engaged with the first gearwheel 46, so as to couple the first gearwheel with the carrier 40 of the differential 38, that is, to couple the first gearwheel with the left and right output shafts 36A, 36B through the carrier. In this position, the dog clutch transmits a torque applied to the first gearwheel 46 to the carrier 40. Therefore, in the first position, the carrier 40 is driven by the main shaft 28 through the first gearwheel 46, and the drivetrain operates with the first reduction ratio between the main shaft and the carrier. In the first position, the second gearwheel 48 is freely rotating around the carrier.

In a second position, the dog clutch 52 is engaged with the second gearwheel 48, so as to couple the second gearwheel with the carrier 40 of the differential 38, that is, to couple the second gearwheel with the left and right output shafts 36A, 36B through the carrier. In this position, the dog clutch transmits a torque applied to the second gearwheel 48 to the carrier 40. Therefore, in the second position, the carrier 40 is driven by the main shaft 28 through the second gearwheel 48, and the drivetrain operates with the second reduction ratio between the main shaft and the carrier. In the second position, the first gearwheel 46 is freely rotating around the carrier.

In a neutral position of the dog clutch 52, the dog clutch disengaged from the first gearwheel 46 and is disengaged from the second gearwheel 48. Therefore, in the neutral position, the differential 38, and thus the left and right output shafts 36A, 36B, are disconnected from the motor shaft 18. In FIG. 1, the dog clutch 52 is shown in the neutral position.

In FIG. 1, a double arrow illustrates the sliding movement of the dog clutch 52 between the neutral position, the first position and the second position.

The drivetrain 14 further comprises a recirculation shaft 54, a first recirculation pinion 56 and a second recirculation pinion 58 which are integral with the recirculation shaft 54. The recirculation shaft 54 is freely rotatable relative to the housing 60 of the drivetrain, by means of a pivot link 62. The first recirculation pinion 56 meshes with the first gearwheel 46 so as to couple the first gearwheel with the recirculation shaft 54 and the second recirculation pinion 58 meshes with the second gearwheel 48 so as to couple the second gearwheel with the recirculation shaft 54.

Preferably, the recirculation shaft 54 is mounted with respect to the housing 60 with single row tapered roller bearings or double row tapered roller bearings, absorbing any axial forces exerted on the recirculation shaft.

The ratio of the number of teeth of the first main pinion 32 over the number of teeth of the second main pinion 34 is essentially identical to the ratio of the number of teeth of the first recirculation pinion 56 over the number of teeth of the second recirculation pinion 58. Preferably, the first recirculation pinion 56 is identical to the first main pinion 32, that is, they have, in particular, the same gear module and number of teeth, and the second recirculation pinion 58 is identical to the second main pinion 34, that is, they have, in particular, the same gear module and number of teeth.

When the dog clutch 52 is in the first position, the recirculation shaft 54 is driven by the main shaft 28 through the second gearwheel 48 meshing with the second main pinion 34 and the second recirculation pinion 58. Since the second gearwheel 48 freely rotates around the carrier 40, the rotation of the second gearwheel is independent of the rotation of the carrier. Thus, when the dog clutch 52 is in the first position, the second gearwheel 48 allows for transmitting the rotation of the main shaft 28 to the recirculation shaft 54.

Subsequently, when the dog clutch 52 is in the first position, the carrier 40 is driven simultaneously by the main shaft 28 through the first gearwheel 46 meshing with the first main pinion 32, and by the recirculation shaft 54 through the first gearwheel meshing with the first recirculation pinion 56.

The first position of the dog clutch 52 corresponds to a first speed configuration of the drivetrain, in which the main shaft 28 drives the carrier 40 with the first reduction ratio.

Similarly, when the dog clutch 52 is in the second position, the recirculation shaft 54 is driven by the main shaft 28 through the first gearwheel 46 meshing with the first main pinion 32 and the first recirculation pinion 56. Since the first gearwheel 46 freely rotates around the carrier 40, the rotation of the first gearwheel is independent of the rotation of the carrier. Thus, when the dog clutch 52 is in the second position, the first gearwheel 46 allows for transmitting the rotation of the main shaft 28 to the recirculation shaft 54.

Subsequently, when the dog clutch 52 is in the second position, the carrier 40 is driven simultaneously by the main shaft 28 through the second gearwheel 48 meshing with the second main pinion 34, and by the recirculation shaft 54 through the second gearwheel meshing with the second recirculation pinion 58.

The second position of the dog clutch 52 corresponds to a second speed configuration of the drivetrain, in which the main shaft 28 drives the carrier 40 with the second reduction ratio.

In the first position of the dog clutch 52, because the first gearwheel 46 is meshing simultaneously with the first main pinion 32 and with the first recirculation pinion 56, the load experienced by the meshing teeth of the first gearwheel is roughly divided by two. Similarly, in the second position of the dog clutch, because the second gearwheel 48 is meshing simultaneously with the second main pinion 34 and with the second recirculation pinion 58, the load experienced by the meshing teeth of the second gearwheel is roughly divided by two.

In other words, in the first and in the second positions of the dog clutch 52, a part of the torque transmitted to the main shaft 28 by the electric motor 12 is directly transmitted from the main shaft to the first or second gearwheel engaged with the dog clutch, and therefore engaged with the carrier 40, while another part of the torque transmitted to the main shaft by the electric motor is transmitted from the main shaft to the first or second gearwheel engaged with the dog clutch through the recirculation shaft and the recirculation pinion meshing with said gearwheel.

Therefore, thanks to the recirculation shaft and the recirculation pinions, the load transmitted to the gearwheel 46, 48 engaged with the dog clutch 52 and with the carrier 40 is divided between two pinions, that is, between one of the main pinion 32, 34 and one of the recirculation pinion 56, 58.

Having positioned the dog clutch 52 around the carrier 40 is particularly advantageous, since, it allows using the gearwheel 46 or 48 not engaged with the dog clutch 52 to transmit torque from the main shaft 28 to the recirculation shaft 54, without the need for additional gears. In other words, in the drivetrain 14, the first and second gearwheels 46, 48 have two distinct functions: when the dog clutch is either in the first position or in the second position, one of the two gearwheels is used to share the torque provided by the electric motor 12 between the main shaft 28 and the recirculation shaft 54, and the other one of the two gearwheels is used to transmit the torque shared between the main shaft and the recirculation shaft to the carrier 40, and therefore to the left and right output shafts 36A, 36B. The compactness of the drivetrain 14 is therefore particularly optimized.

Furthermore, since the gearwheel 46 or 48 engaged with the dog clutch 52 is meshing with two pinions each transmitting roughly half of the torque coming from the electric motor 12, the teeth of the gearwheels 46, 48 and of the pinions 32, 34, 56, 58 meshing therewith are subjected to only roughly half of the load they would be if the gearwheels 46, 48 were each meshing with only one pinion. More precisely, the bending stress experienced by the teeth is reduced proportionally to the reduction of the torque transmitted by the gearwheels and pinions while the contact stress experienced by the teeth is reduced proportionally to the square root of the reduction of the torque transmitted by the gearwheels and pinions. In other words, considering that the teeth bending stress is proportional to the transmitted torque and that the teeth contact stress is proportional to the square root of the torque, the reduction of the torque described here above results in a reduction of the stresses experienced by the teeth of the gearwheels and pinions. As a result, the gearwheels 46, 48 and pinions 32, 34, 56, 58 are designed to be more compact, with smaller diameters, facewidths and gear module, than the gearwheels and pinions of previously known vehicles.

Figure 2:
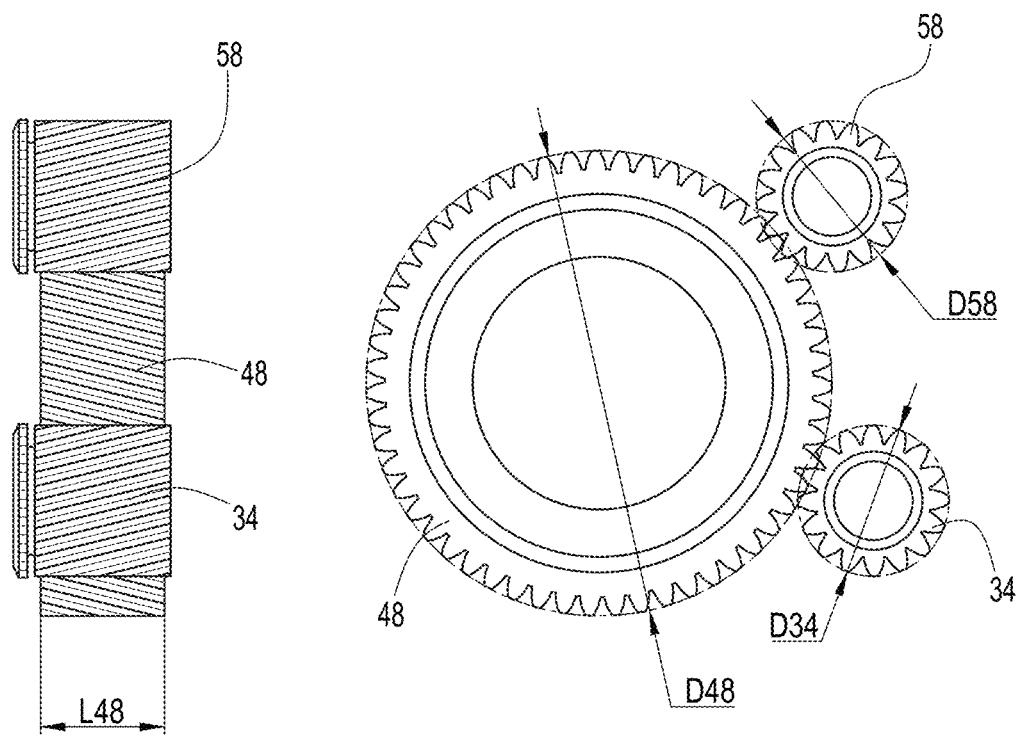
FIG. 2 includes a front view and a side view of a part of a drivetrain according to the disclosure, the drivetrain belonging to the vehicle of FIG. 1.

On FIG. 2 are shown a face view and a side view of the second gearwheel 48 meshing with the second main pinion 34 and the second recirculation pinion 58. L48 denotes the facewidth of the second gearwheel 48, which is equal to the overlapping facewidth of the pinions 34, 58, D48 denotes the external diameter of the second gearwheel 48, D34 denotes the external diameter of the second main pinion 34 and D58 denotes the external diameter of the second recirculation pinion 58, which is preferably equal to the diameter D34.

As an example to provide a basis for comparison, on a previously-known vehicle with a drivetrain similar to the one of the disclosure but without a recirculation shaft, to accommodate for the high load on the gears, a facewidth of the gearwheel with the second ratio would be about 95 mm, a diameter of the gearwheel would be about 370 mm and a diameter of the only pinion meshing with the gearwheel would be about 105 mm.

Starting from the previous configuration, one can reduce the facewidth L48 of the second gearwheel and of the pinions while keeping the diameters D48, D34 and D58 equal to 370 mm. In some embodiments, the facewidth L48 can be reduced to 43 mm, thus reducing the facewidth, of the gears by more than two. Even with the extra weight added by the recirculation shaft 54, the total weight of the drivetrain 14 is, in this example, reduced by about 30% to 50%.

Starting from the previous configuration, one can also reduce the diameters D48, D34 and D58 while keeping the facewidth L48 of the second gearwheel and of the pinions equal to 95 mm. In some embodiments, the diameter D48 of the second gearwheel 48 can be reduced to 268 mm, and the diameters D34, D58 can be reduced to 76 mm. Thus, the total footprint corresponding to the sum of the diameter D48 and of the diameter D34 is reduced from 475 mm to 344, thus allowing improving the ground clearance of the electric vehicle 10. When the pinions are located on a side of the gearwheel, as in the example of FIG. 2, the footprint of the drivetrain 14 is further reduced along a vertical axis, further improving the ground clearance of the electric vehicle 10. Furthermore, even with the extra weight added by the recirculation shaft 54, the total weight of the drivetrain 14 is, in this example, reduced by about 30% to 50%.

Starting from the previous configuration, one can also reduce simultaneously the diameters D48, D34 and D58 and the facewidth L48 in order to meet specific design requirements.

The gains given in the examples above were based on a real example of a drivetrain and calculated using the standard ISO 6336, with constant bending and contact stress levels.

Furthermore, when the drivetrain 14 is in a stable configuration, for example when the electric vehicle 10 is driving at a constant speed on a flat surface, the torque transmitted by the main pinions 32, 34 to the gearwheel 46 or 48 engaged with the dog clutch 52 tend to be equal to the torque transmitted by the recirculation pinions 56, 48 to said gearwheel, the system having a tendency to reach an equilibrium. However, when the electric vehicle is starting or accelerating, an imbalance tends to be develop, so that the main pinion and the recirculation pinion meshing with the gearwheel engaged with the dog clutch do not transmit the same torque to said gearwheel. Typically, such an imbalance can lead to one of the pinion transmitting about 40% of the load while the other pinion transmits about 60% of the load. The gains given in the examples above are accounting for this imbalance, by considering that each pinion transmits 60% of the torque, and not 50% as in a perfect case. Other load distribution between the two pinions can be considered to account for this imbalance.

In the example, the drivetrain 14 is a parallel axis drivetrain. Hence, the motor shaft 18, the main shaft 28, the recirculation shaft 54 and the left and right output shafts 36A, 36B are parallel to each other.

It is to be noted that, in the electric vehicle 10, the recirculation shaft 54 preferably has no other function that meshing with the first and second gearwheels 46, 48 to split the load seen by the teeth of the first or second gearwheel engaged with the dog clutch 52.

The fact that the first and second gearwheels 46, 48 are mounted onto the right and left output shafts 36A, 36B through the bearings 50 which are preferably needle roller bearings, single row tapered roller bearings or double row tapered roller bearings is advantageous, as these types of bearing are particularly adapted to allow for some slight lateral and radial movements of the first and second gearwheels. Such lateral and radial movements are useful to increase the flexibility of the drivetrain 14, thus avoiding risks of jamming due to the fact that both gearwheels 46, 48 are meshing simultaneously with the main pinions 32, 34 and the recirculation pinions 56, 58. In other words, allowing lateral movements for the gearwheels 46, 48 using these types of bearings allows the drivetrain 14 not to be hyperstatic. Hence, thanks to the freedom of movements of the gearwheels provided by the bearings 50, the gearwheels can be considered as floating gearwheels, which would seek a balance position between the main shaft and the recirculation shaft, minimizing the stresses on the gearwheels.

Figure 3:
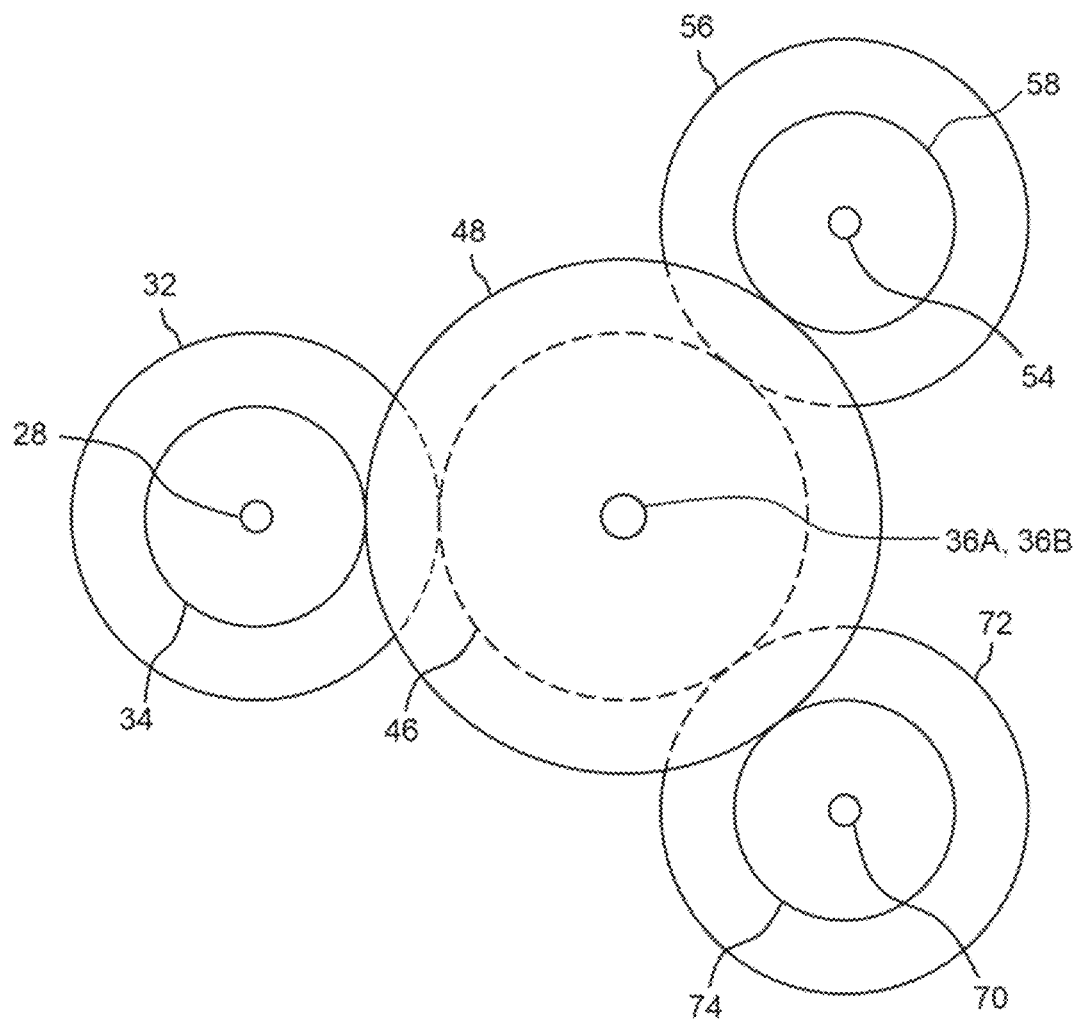
FIG. 3 is a side view of a part of another drivetrain according to the disclosure.

In a variant, shown in FIG. 3, the drivetrain 14 comprises an auxiliary recirculation shaft 70, a first auxiliary recirculation pinion 72 and a second auxiliary recirculation pinion 72, which are integral with the auxiliary recirculation shaft 70. The auxiliary recirculation shaft 70 is freely rotatable relative to the housing 60 of the drivetrain. The first auxiliary recirculation pinion 72 and the second auxiliary recirculation pinion 74 are respectively meshing with the first gearwheel 46 and the second gearwheel 48. Furthermore, the first and second auxiliary recirculation pinions and the first and second recirculation pinions have the same number of teeth. Preferably, the first recirculation pinion 56 is identical to the first auxiliary recirculation pinion 72 and the second recirculation pinion 58 is identical to the second auxiliary recirculation pinion 74. Therefore, the auxiliary recirculation shaft 70, the first auxiliary recirculation pinion 72 and the second auxiliary recirculation pinion 74 operate respectively as the recirculation shaft 54, the first recirculation pinion 56 and the second auxiliary pinion 58. In other words, the drivetrain 14 comprises two recirculation shafts, further reducing the load transmitted by each pinion. Thus, the first and second gearwheels 46, 48, the first and second main pinions 32, 34, the first and second recirculation pinions 56, 58 and the first and second auxiliary recirculation pinions 72, 74 can have smaller facewidths and/or diameters as the ones of the embodiment described here above.

In a variant, not shown, the first and second gearwheels 46, 48 are mounted directly around the right and left output shafts 36B, 36A respectively, instead of being mounted around the carrier.

In a variant, not shown, the drivetrain 14 does not comprises a differential 38. In such a variant, the drivetrain comprises a unique output shaft, which drives both the left wheel 16A and the right wheel 16B, the first and second gearwheels 46, 48 are directly mounted around the output shaft through the bearings 50, and the dog clutch 52 is used to couple the first or the second gearwheel to the output shaft.

In a variant, not shown, the dog clutch 52, the first gearwheel 46 and the second gearwheel 48 are mounted around a shaft, which is distinct from the left and right output shafts 36A, 36B. In other words, in such a variant, the dog clutch and the first and second gearwheel are located in the drivetrain 14 upstream from the differential.

In a variant, not shown, the drivetrain 14 does not include the intermediate reduction shaft 22, or includes more than one intermediate reduction shaft. The number on intermediate reduction shafts is adjusted depending of the reduction ratio required between the motor shaft 18 and the output shafts 36A, 36B.

In a variant, not shown, the drivetrain 14 also comprises a gearbox, so that the drivetrain can provide more than two speed configuration, that is, more than two different reduction ratio.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:

1. A drivetrain for an electric vehicle, comprising at least:
    a motor shaft, configured to be driven by an electric motor of the electric vehicle,
    an output shaft, configured to drive wheels of the electric vehicle,
    a main shaft, being driven by the motor shaft,
    a first main pinion and a first gearwheel meshing together, the first main pinion being integral with the main shaft and the first gearwheel being mounted around the output shaft so as to rotate freely around the output shaft,
    a second main pinion and a second gearwheel meshing together, the second main pinion being integral with the main shaft and the second gearwheel being mounted around the output shaft so as to rotate freely around the output shaft,
    a clutch system, the clutch system being mounted around the output shaft and being switchable between at least two positions:
        a first position, in which the clutch system is engaged with the first gearwheel so as to couple the first gearwheel with the output shaft, and
        a second position, in which the clutch system is engaged with the second gearwheel so as to couple the second gearwheel with the output shaft,
    a recirculation shaft, configured to be freely rotatable relative to a housing of the drivetrain,
    a first recirculation pinion, integral with the recirculation shaft and meshing with the first gearwheel, and
    a second recirculation pinion, integral with the recirculation shaft and meshing with the second gearwheel,
    and wherein the drivetrain is switchable between two configurations:
        a first speed configuration, in which:
            the clutch system is in the first position,
            the recirculation shaft is driven by the main shaft through the second gearwheel meshing with the second main pinion and the second recirculation pinion, the second gearwheel freely rotating around the output shaft, and
            the output shaft is driven both by the main shaft and by the recirculation shaft through the first gearwheel meshing with the first main pinion and the first recirculation pinion,
        a second speed configuration, in which:
            the clutch system is in the second position,
            the recirculation shaft is driven by the main shaft through the first gearwheel meshing with the first main pinion and the first recirculation pinion, the first gearwheel freely rotating around the output shaft, and
            the output shaft is driven both by the main shaft and by the recirculation shaft through the second gearwheel meshing with the second main pinion and the second recirculation pinion.

2. The drivetrain of claim 1, wherein the output shaft comprises a left output shaft, configured to drive a left wheel of the electric vehicle, and a right output shaft configured to drive a right wheel of the electric vehicle, wherein the drivetrain further comprises a differential, mounted around the output shaft, wherein output gears of the differential are connected to the left output shaft and to the right output shaft, and wherein:
    in the first position of the clutch system, the clutch system is engaged with the first gearwheel, so as to couple the first gearwheel with an input of the differential, and
    in the second position of the clutch system, the clutch system is engaged with the second gearwheel, so as to couple the second gearwheel with the input of the differential.

3. The drivetrain of claim 2, wherein the differential comprises a carrier, the carrier being the input of the differential, wherein the first gearwheel and the second gearwheel are mounted around the carrier so as to rotate freely around the carrier, and wherein the clutch system is integral with the carrier.

4. The drivetrain of claim 3, wherein the drivetrain further comprises two bearings, each of the first gearwheel and the second gearwheel being mounted around the carrier through a respective bearing.

5. The drivetrain of claim 4, wherein the bearings are needle roller bearings, cylindrical roller bearings, single row tapered roller bearings or double row tapered roller bearings.

6. The drivetrain of claim 1, wherein the motor shaft, the main shaft, the recirculation shaft and the output shaft are parallel shafts.

7. The drivetrain of claim 1, wherein the drivetrain further comprises:
    an auxiliary recirculation shaft, configured to be freely rotatable relative to the housing of the drivetrain,
    a first auxiliary recirculation pinion, being integral with the auxiliary recirculation shaft and meshing with the first gearwheel, and
    a second auxiliary recirculation pinion, being integral with the auxiliary recirculation shaft and meshing with the second gearwheel,
    wherein, in the first speed configuration of the drivetrain:

the auxiliary recirculation shaft is driven by the main shaft through the second gearwheel meshing with the second main pinion and the second auxiliary recirculation pinion, and the output shaft is driven by the main shaft, by the recirculation shaft and by the auxiliary recirculation shaft, through the first gearwheel meshing with the first main pinion, the first recirculation pinion and the first auxiliary recirculation pinion, and wherein, in the second speed configuration of the drivetrain:

the auxiliary recirculation shaft is driven by the main shaft through the first gearwheel meshing with the first main pinion and the first auxiliary recirculation pinion, and the output shaft is driven by the main shaft, by the recirculation shaft and by the auxiliary recirculation shaft through the second gearwheel meshing with the second main pinion, the second recirculation pinion and the second auxiliary recirculation pinion.

8. The drivetrain of claim 1, wherein the drivetrain further comprises an input gear, integral with the main shaft and driven by the motor shaft.

9. The drivetrain of claim 1, wherein the drivetrain further comprises at least one intermediate shaft, driven by the motor shaft, driving the main shaft and acting as an additional reduction stage between the motor shaft and the output shaft.

10. The drivetrain of claim 1, wherein the clutch system is a dog clutch.

11. The drivetrain of claim 1, wherein the clutch system is further switchable in a third neutral position, in which the clutch system is disengaged from the first gearwheel and disengaged from the second gearwheel, the output shaft being disconnected from the motor shaft.

12. The drivetrain of claim 1, wherein a ratio of a number of teeth of the first main pinion over a number of teeth of the second main pinion is essentially identical to a ratio of a number of teeth of the first recirculation pinion over a number of teeth of the second recirculation pinion.

13. The drivetrain of claim 12, wherein the first recirculation pinion is identical to the first main pinion and the second recirculation pinion is identical to the second main pinion.

14. An electric vehicle comprising an electric motor, a drivetrain and wheels, the drivetrain being driven by the electric motor and driving the wheels, wherein the drivetrain is according to claim 1.

* * * * *